United States Patent
Walker et al.

[11] 3,911,731
[45] Oct. 14, 1975

[54] NON-CONTACTING SELF-CALIBRATING VIBRATION SENSOR

[75] Inventors: Duncan N. Walker, Jonesville; Matthew A. Kazlauskas, Pattersonville, both of N.Y.

[73] Assignee: General Electric Company, Schenectady, N.Y.

[22] Filed: Feb. 14, 1974

[21] Appl. No.: 442,505

[52] U.S. Cl. .................................................. 73/71.4
[51] Int. Cl.² .................. G01M 1/22; G01H 11/00
[58] Field of Search ............ 73/71.4, 71.2, 71, 67.2, 73/67, 1 DV, 1 R; 324/40, 34 D

[56] References Cited
UNITED STATES PATENTS

| | | | |
|---|---|---|---|
| 3,180,136 | 4/1965 | Foster ................................. | 73/71.4 |
| 3,316,756 | 5/1967 | Hickman ............................. | 73/71.4 |
| 3,353,098 | 11/1967 | Foster et al. ...................... | 73/71.4 X |
| 3,379,972 | 4/1968 | Foster et al. ...................... | 73/1 DV |
| 3,455,148 | 7/1969 | Foster et al. ...................... | 73/71.4 X |
| 3,456,484 | 7/1969 | Schwartz ........................... | 73/1 DV |
| 3,503,251 | 3/1970 | Flagge ................................ | 73/71.4 |
| 3,512,402 | 5/1970 | Foster ................................ | 73/71.4 |

*Primary Examiner*—Richard C. Queisser
*Assistant Examiner*—Stephen A. Kreitman
*Attorney, Agent, or Firm*—John F. Ahern; James W. Mitchell

[57] ABSTRACT

An inertially referenced self-calibrating vibration sensor comprising a non-contacting probe, an accelerometer, a solenoid vibrator, and electrical circuitry for controlling the sensor. The sensor is mounted in spaced relationship with an object whose vibrations are to be measured. The probe produces an output signal representing both sensor movement and object movement while the accelerometer produces an output signal representative only of sensor movement. Circuitry is provided to combine the two signals in a manner to produce a signal representing only object movement.

10 Claims, 2 Drawing Figures

NON-CONTACTING SELF-CALIBRATING VIBRATION SENSOR

BACKGROUND OF THE INVENTION

The present invention relates to vibration sensors and, particularly, to a non-contacting self-calibrating vibration sensor.

Frequently it becomes necessary to measure vibrations of an object in which the vibrations may be of very small amplitude and in which it is impractical to attempt to measure the vibrations by utilizing a device in contact with the object. For example, in large electrical generators utilizing a shaft which may weigh several tons, small eccentricities in the rotation of the shaft may set up undesiable vibrations. At the same time, because of the particular environment in which the shaft is located, it may be impractical to utilize a vibration measuring device which would have to be in contact with the rotating shaft. To avoid these problems a number of different types of non-contacting devices or probes have been developed; for example, Hall effect probes, capacitance probes, resonant coil probes, and eddy current probes. Although these various probes provide a non-contacting means for developing an electrical signal related to shaft vibration, when these probes are used in hostile environments the probe itself may also be subject to vibration and to temperature gradients and magnetic fields which may affect probe response. For this reason self-calibrating non-contacting probes in which the probe is subjected to a known frequency of vibration such that an electrical output signal from the probe includes a component of known frequency and a component related to the vibration of the object to be measured have been developed. Since the forced vibration of the probe is at a known frequency and amplitude, electrical means can be utilized to extract the signal caused by the forced vibration from the probe output signal. By adjusting the amplitude of the vibrations and the amplitude of the probe output signal to produce a predetermined amplitude signal at the known frequency, the probe may be effectively calibrated. However, this procedure fails to take into account those output signals from the probe which may be due to vibrations induced in the probe and its mounting arrangement by vibrations in the surrounding environment.

In accordance with the present invention an arrangement is provided for measuring vibration of an object in which a signal representative only of probe vibration is developed and which signal is subtracted from the probe output signal to produce a resultant signal representative only of object vibration.

Accordingly, it is an object of this invention to provide an improved non-contacting self-calibrating vibration sensor.

It is another object of this invention to provide an improved non-contacting self-calibrating vibration sensor including means for eliminating the component of vibrations which is caused by vibration of the sensor itself.

It is another object of this invention to provide an improved non-contacting self-calibrating vibration sensor including means for producing an output signal proportional only to the vibrations of an object being monitored.

BRIEF DESCRIPTION OF THE INVENTION

In carrying out the objects of this invention in one form thereof, there is provided an electrical sensor comprising a non-contacting probe, an accelerometer mounted in fixed relationship with the probe, and a solenoid for imparting a fixed amplitude and frequency of vibration to the probe. Electrical circuitry is connected to receive output signals from both the accelerometer and the probe and for combining the output signals in such a manner that the output signal from the accelerometer, which is double integrated to yield a displacement signal, is subtracted from the output signal from the probe to provide a resultant signal which is proportional only to vibration of the object being monitored. Probe sensitivity is matched to equal the double integrated accelerometer signal. In addition, the drive voltage supplied to the solenoid driver circuit is continuously updated by a feedback loop which monitors the output from the accelerometer to assure that the induced vibrations in the sensor are of a fixed amplitude. In the case of a rotating object such as a large generator shaft a feedback loop continuously monitors the rotational frequency of the shaft and provides an output signal to the solenoid drive circuit to insure that the induced vibrations in the probe are not at the rotational frequency of the shaft or any harmonics thereof.

BRIEF DESCRIPTION OF THE DRAWINGS

For a better understanding of the invention, reference may be had to the accompanying drawings in which.

While it is contemplated that the non-contacting self-calibrating sensor of the present invention have other applications, it is particularly useful in measurement of the vibrations of a rotating shaft and is particularly described below in connection with such use.

DETAILED DESCRIPTION OF THE INVENTION

Figure 1:
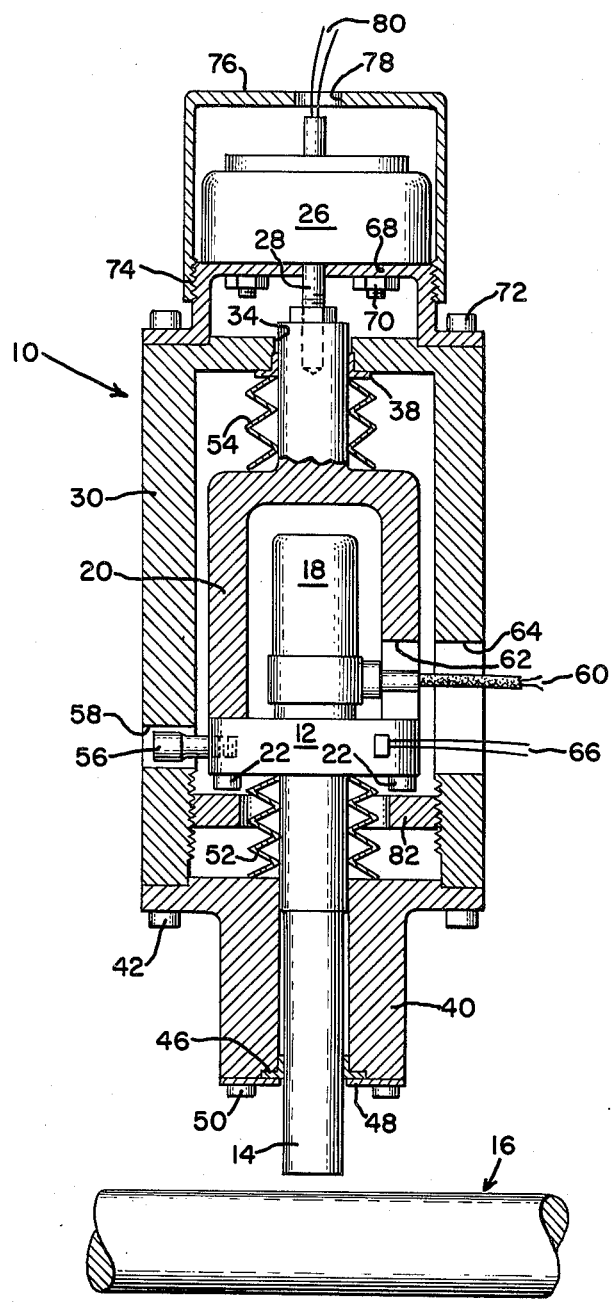
FIG. 1 is a simplified mechanical representation of the sensor of the present invention.

Referring now to FIG. 1, there is shown an embodiment of the sensor 10 of the present invention. Sensor 10 includes a probe 12 preferably of the type having a portion 14 which may be arranged to provide a gap between an end of the probe and a surface of a rotating shaft indicated generally at 16. Vibration of probe 12 is detected by an accelerometer 18 fixedly attached to the upper surface of probe 12. Calibrating vibrations are induced in probe 12 by means of a plunger 20 attached to probe 12 by means of screws 22; and, attached to a solenoid 26 by extension 28. Thus, vibratory movement of solenoid 26 results in corresponding movement of probe 12.

Sensor 10 is provided with a housing 30 of generally cylindrical shape. The upper end of housing 30 is provided with an opening 34 of sufficient diameter to permit free passage of extension 28. Opening 34 also includes a stepped portion for receiving a bearing surface or bushing 38 which may be of nylon or other suitable material. The opposite end of cylinder 30 is closed by cylindrical guide member 40 which is attached to housing 30 by means of screws 42. Member 40 is also provided with a stepped portion for receiving a bearing surface or bushing 46. Bushing 46 is held in place by cover member 48 attached to the end of member 40 by screws 50. Each of the bushings 38 and 46 is provided with an inside diameter of such dimension as to provide a slight frictional damping effect to the movement of probe 12. Further damping of probe 12 is provided by Schnorr washer springs 52 and 54 located respectively at the lower end of probe 12 and at the upper end of plunger 20. The function of the Schnorr washers, 52 and 54, is to provide a suspension for the probe 12 and accelerometer 18 within the housing 30.

Electrical output signals from accelerometer 18 are brought out of the sensor by means of lead wires 60 through an opening 62 in plunger 20 and an opening 64 in housing 30. Output signals from probe 12 are brought out through lead wires 66 through opening 64 in housing 30. To prevent rotation of the probe and plunger assembly and possible breakage of lead wires 60 and 66, there is provided an anti-rotation pin 56 fixedly attached to probe 12 through an elongated opening 58 in a wall of housing 30.

solenoid 26 is mounted on a bracket 68 by means of fasteners 70 and bracket 68 is attached to housing 30 by means of screws 72. Bracket 68 may be provided with threads, indicated generally at 74, to provide a means for attaching a protective cover 76 over solenoid 26. Cover 76 is provided with an opening 78 through which lead wires 80 for providing power to solenoid 26 are directed.

In order to prevent excessive movement of probe 12, a ring 82 is provided at the lower end of housing 30. Ring 82 is preferably provided with threads about its outside circumference such that it may be screwed into the lower end of housing 30 and adjusted to provide appropriate vibration limits. Movement of the probe 12 is thus limited by engagement of sscrews 22 with the ring 82.

Figure 2:
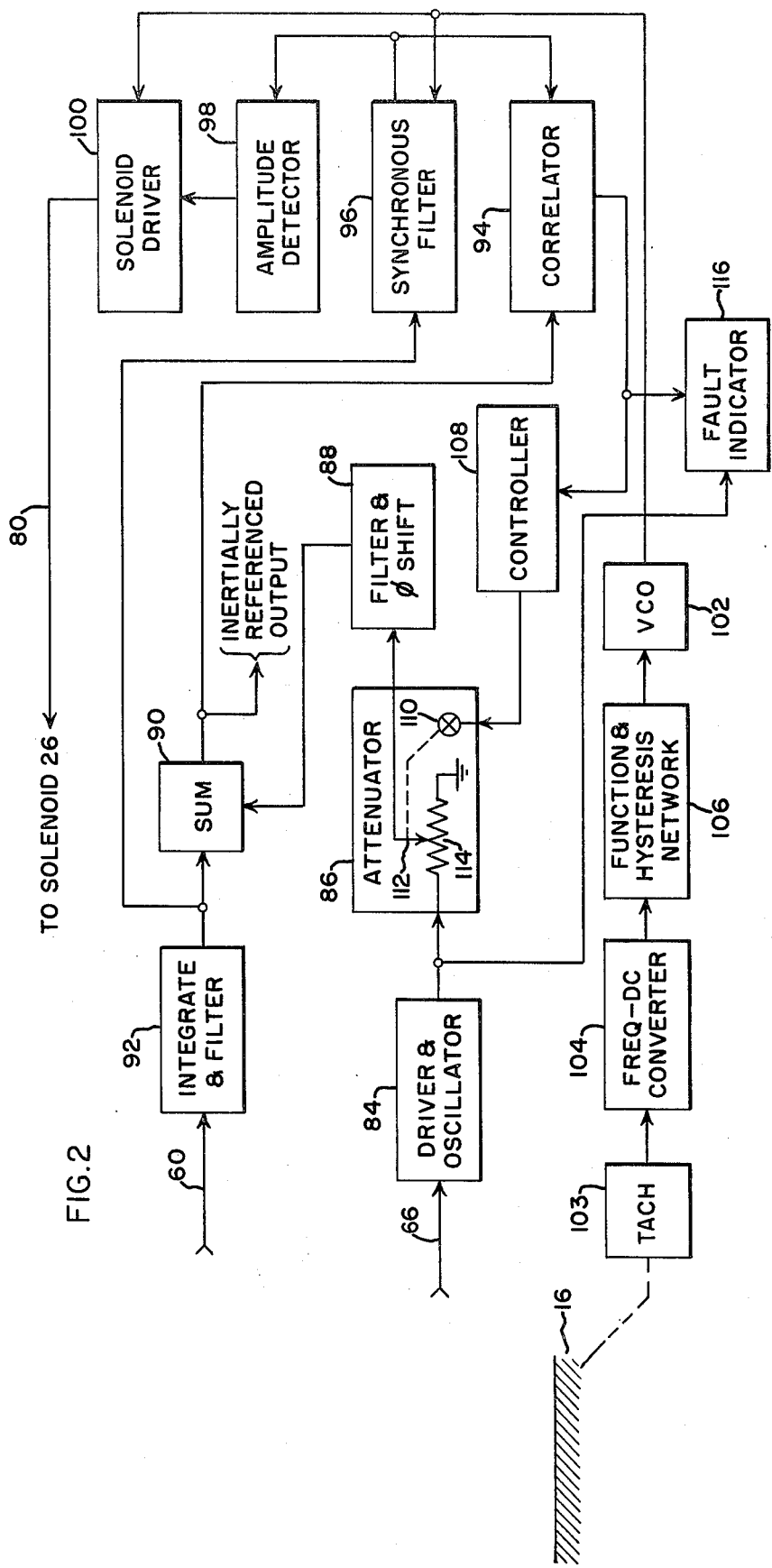
FIG. 2 is a simplified block diagram of the electrical apparatus utilized in conjunction with the sensor shown in FIG. 1.

Referring now to FIG. 2, a signal from probe 12 is directed by means of lead wires indicated at 66 into a probe driver circuit 84. In a preferred embodiment, wherein probe 12 comprises an eddy current probe, driver circuit 84 comprises an oscillator for exciting probe 12 and a demodulator of a type well known in the art for removing the oscillator carrier frequency from a modulated signal detected as an output from probe 12. The output signal from probe driver circuit 84 is a sinusoidal signal varying at a frequency dependent on the rate of change of displacement between the probe 12 and surface 16.

The output signal from circuit 84 is an uncalibrated signal which may vary as a function of vibration, material characteristics of surface 16, temperature of surface 16, temperature of probe 12, temperature gradients in both surface 16 and probe 12, and the rotational velocity of surface 16 among other factors. In order to calibrate the output signal from circuit 84 to compensate for the above conditions, there is provided an attenuator circuit 86 connected to receive the output signal from circuit 84 and responsive to a feedback calibration signal, to be more fully described hereinafter, to adjust the amplitude of the output signal from circuit 84 to accurately represent probe 12 displacement from surface 16. Attenuator 86 may comprise any of several types of electronically variable attenuators such as, for example, a motor driven potentiometer as shown schematically in the block diagram representation of attenuator 86. The output of attenuator 86 is connected to a filter and phase shift equalizing network 88 for reasons to become apparent. The output of network 88 is directed into a first input terminal of summing network 90.

The signal on lead wires indicated at 60 from accelerometer 18 (see FIG. 1) is proportional to the acceleration of sensor 10; consequently by integrating the signal twice the resultant signal becomes proportional to displacement. This integration is accomplished by double integrating and filter network 92. Filtering is required in network 92 since the integrating process tends to cause considerable noise to be placed on the accelerometer output signal, particularly in the case of a crystal-type accelerometer which tends to be inherently noisy; consequently a filter is required to remove the noise signals to assure that the output from network 92 represents displacement only. The output signal from network 92 is directed into a second input of summing network 90.

As will be obvious to those skilled in the art, double integration produces a significant phase shift; therefore, to add the signal from network 92 to the signal from attenuator 86 in inverse phase relationship it is necessary to phase shift the latter signal to the same degree as the accelerometer output signal is phase shifted in network 92. This phase shift is accomplished by filter and phase shift equalizing network 88. Summing network 90 combines the output signals from network 92 and network 88 to provide a resultant signal which, when the system is properly calibrated, represents only those vibrations attributable to movement of surface 16.

To accomplish self-calibration the output of summing network 90 is also directed into a first input terminal of correlator 94. The second input terminal of correlator 94 is connected to receive a signal at calibration frequency from narrow band synchronous filter 96. Correlator 94 is of a type well known in the art which operates to multiply the input signals which it receives but only at a frequency determined by the signal on its second input terminal, i.e., correlator 94 will produce an output signal proportional only to the product of the signal on its second input terminal and that component of the signal on its first input terminal which is at the same frequency as the frequency of the signal on the second input terminal. The output signal of correlator 94 is proportional to the component of that signal at the output of summing network 90 which is at calibration frequency. This output signal from correlator 94 is suitably amplified and integrated in controller 108 and used to drive motor 110 to adjust arm 112 of potentiometer 114 in attenuator circuit 86 until that component of signal at calibration frequency at the output of network 90 is zero.

The signal from filter 96 is a sinusoidal signal at calibration frequency and at an amplitude proportional to the amplitude of induced vibrations in probe 12 generated by solenoid 26. Filter 96 is of a type well known in the art sometimes referred to as a tracking filter. The output signal of synchronous filter 96 is derived from an input signal received from the output of network 92 which input signal contains a component at calibration frequency. Filter 96 extracts this calibration frequency component for use in correlator 94 and also to supply to amplitude detector 98. A feedback loop to be discussed below provides a signal to maintain the center frequency of filter 96 at calibration frequency.

Detector 98 determines, by monitoring the output of filter 96, whether the induced vibrations in probe 12 at the calibration frequency are at a predetermined amplitude and provides an output signal proportional to the deviation of those signals from the predetermined amplitude. The output signal from detector 98 is supplied to a pulse width modulated solenoid drive circuit 100 which supplies power to solenoid 26. Drive circuit 100 may comprise a power chopper of a type well known in the art such that the output signals from detector 98 are effective to change the width of the driving pulses supplied to solenoid 26 to thus adjust the induced vibration displacement of probe 12 until the amplitude of the calibration signals from filter 96 are at the predetermined amplitude. Thus, the two feedback loops work jointly from filter 96 to assure first that the probe is vibrated a predetermined amount of displacement, and secondly, that the output signal from network 90 is calibrated to represent a predetermined amount of displacement per unit voltage.

In order to prevent the calibration frequency from coinciding with the vibration (rotational) frequency or any harmonics thereof of the shaft or any test object represented by surface 16, there is provided a feedback loop responsive to such vibration (rotational) frequency for setting the calibration frequency. This feedback loop comprises a tachometer 103, a frequency to DC converter 104, a function and hysteresis network 106, and a voltage controlled oscillator (VCO) 102. Tachometer 103 is connected to the shaft represented by surface 16 and provides an AC signal having a frequency proportional to the rotational frequency of the shaft. Converter 104 converts the AC signal to a DC signal. The function and hysteresis network 106 assures that rapid changes in the output signal of converter 104 are not effective to cause rapid changes in the output of VCO 102 which would result in inducing transient oscillations in the calibration frequency signal. Also, a predetermined relationship between rotor speed and calibration frequency is established here. The hysteresis at the segment breakpoints prevents frequency unstable speeds. VCO 102 is responsive to the DC signal from network 106 to supply a calibration frequency signal to solenoid driver circuit 100 and to filter 96. VCO 102 is adjusted to assure that the calibration frequency signal is at a frequency different from the vibration (rotational) frequency of the shaft represented by surface 16 or at any harmonics of that rotational frequency.

The output signal from VCO 102 controls the frequency of the solenoid drive pulses supplied by driver 100. As discussed previously, the width of the drive pulses is controlled by detector 98. Thus, VCO 102 effectively controls the frequency of the calibrating vibrations established in sensor 10 while detector 98 effectively controls the amplitude of those vibrations. Since the VCO output signal sets the calibration frequency, it is also used as an input signal to filter 96 to set the center frequency of that filter.

A fault indicator 116 is also provided to monitor the output of demodulator 84 to detect abnormal gap between target rotor 16 and probe 12, thus assuring mounting and spacing for normal operation. As shown in FIG. 2, the output of correlator 94 is also directed into fault indicator 116. Indicator 116 is responsive to a predetermined signal proportional to static gap from demodulator 84 or gain error signal from correlator 94 to initiate an alarm condition to thereby indicate that mounting and spacing is incorrect or that sensor 10 wiring or electronics is defective.

In operation, assuming that a shaft represented by surface 16 is rotating, sensor element 10 is disposed within a predetermined distance from surface 16 and fixedly attached at that position. Tachometer 103 supplies an output signal representative of the rotational frequency of the shaft which, signal is detected by frequency to DC converter 104. Converter 104 in turn supplies a DC signal proportional to that frequency of rotation to function and hysteresis network 106 to present a relationship between rotor speed and calibration frequency. The output signal from network 106 is a DC voltage proportional to shaft rotation frequency and is supplied to VCO 102. VCO 102 is set to provide a fixed calibration frequency output signal for a given input voltage from network 106. The calibration frequency output signal from voltage controlled oscillator 102 is directed into pulse width modulated solenoid drive circuit 100 which provides a drive current to solenoid 26 at the calibration frequency which causes the probe 12 to vibrate at the calibration frequency.

Probe 12 is excited by an oscillatory signal supplied by circuit 84 and provides an output signal comprising amplitude modulation of the oscillatory signal. Circuit 84 demodulates or removes the oscillatory signal and supplies the demodulated signal to attenuator 86. Attenuator 86, which is initially adjusted at midpoint, attenuates the demodulated signal and supplies it to network 88 where the signal is filtered and phase shifted a predetermined amount. The resultant output signal from network 88 is directed into a first input terminal of summing network 90 where it is to be added in inverse phase relationship to the signal from network 92 which latter signal is derived from the output signal from accelerometer 18.

The output signal from accelerometer 18 is double integrated and filtered in network 92 to yield a signal proportional to probe 12 displacement. This signal is directed into a second input terminal of summing network 90 where it is added to the output signal from network 88. The output signal from network 90, assuming the sensor is calibrated, represents only displacement of surface 16 and hence is inertially referenced.

Initially, of course, calibration is unlikely and therefore a component of the signal at the output of network 90 will be at calibration frequency. This component is detected by correlator 94 which then produces an output signal proportional to the amplitude of that component. The signal from correlator 94 is amplified in controller 108 and is used to drive motor 110 to adjust potentiometer 114 until the amplitude of that component is such that it is completely canceled by addition in network 90.

Adjustment of the amplitude of the accelerometer output signal is accomplished by extracting the calibration frequency component from the signal out of network 92 in filter 96. Detector 98 monitors the amplitude of the signal from filter 96 and provides a signal to driver 100 to adjust the width of the driving pulses supplied to solenoid 26 until the signal amplitude reaches a predetermined value.

Fault indicator 116 monitors the output of both demodulator 84 and correlator 94 and will provide an alarm signal if either of those outputs exceeds predetermined levels.

It will thus be seen that the objects set forth are efficiently obtained and since certain charges may be made in the above constructions without departing from the scope of the invention, it is intended that all matter contained in the above description or shown in the accompanying drawings shall be interpreted as illustrative and not in a limiting sense.

What is claimed as new and desired to be secured by Letters Patent of the United States is:

1. A non-contacting, self-calibrating vibration sensor comprising:

first means for producing a first output signal representative of the instantaneous displacement between said sensor and an object;

second means for vibrating said first means at a predetermined freguency and amplitude;

third means, comprising an accelerometer and an integrating and filtering network connected to receive a signal from said accelerometer, for producing a second output signal representative of the frequency and amplitude of displacement of said first means;

electrical means for combining said first and second output signals to produce a resultant output signal representative only of the frequency and amplitude of displacement of said object.

2. The non-contacting vibration sensor as defined in claim 1 wherein said first means is an eddy current probe.

3. The non-contacting vibration sensor as defined in claim 1 wherein said electrical means includes:

phase shift means connected to receive said first output signal and responsive thereto to provide a third output signal in phase with said second output signal; and summing means having first and second input terminals and an output terminal, said summing means being connected to receive said second output signal on said first input terminal and to receive said third output signal on said second input terminal, wherein said summing means is effective to combine said second and third output signals in inverse phase relationship to produce said resultant output signal.

4. The non-contacting vibration sensor as defined in claim 1 and including means for adjusting said predetermined frequency of vibration of said sensor.

5. A sensor for measuring vibrations of a rotating shaft, said sensor comprising:

a housing;

an eddy current probe disposed within said housing;

a crystal accelerometer attached to said probe, said accelerometer producing a first output signal in response to movement of said probe;

a solenoid attached to said housing, said solenoid operatively connected with said probe;

first electrical means connected to supply AC power to said solenoid to effect vibration of said probe at a predetermined frequency and amplitude;

second electrical means connected to receive said first output signal, said electrical means being effective to double integrate said first output signal to thereby produce a second output signal proportional to probe displacement;

third electrical means connected to supply oscillatory power to said probe, said third electrical means including a demodulator for producing a third output signal from said probe;

fourth electrical means connected to receive said third output signal, said fourth electrical means being effective to phase shift said probe output signal a predetermined amount and to provide a fourth output signal in phase with said second output signal;

fifth electrical means connected to receive said second output signal on a first input terminal and to receive said fourth output signal on a second input terminal, said fifth electrical means being effective to sum said second and fourth output signals in inverse phase relationship to produce a resultant signal representative of vibrations of said shaft.

6. The sensor as defined in claim 5 and including means for controlling said predetermined frequency of vibration, said means comprising:

first means for producing a signal proportional to the rotational frequency of said shaft; and second means responsive to said signal to effect control of the frequency of said AC power from said first electrical means.

7. The sensor as defined in claim 5 and including means for controlling the amplitude of vibrations of said probe at said predetermined frequency, said means comprising:

frequency and amplitude responsive means connected to receive said second output signal and effective to provide a fifth output signal proportional to the amplitude of the component of said second output signal at said predetermined frequency; and means responsive to said fifth output signal to effect control of said AC power from said first electrical means to maintain said vibrations of said probe at said predetermined amplitude.

8. The sensor as defined in claim 5 and including a self-calibration circuit comprising:

variable attenuator means serially connected between said third electrical means and said fourth electrical means;

frequency responsive means connected to receive said resultant signal, said frequency responsive means producing a sixth output signal proportional to the amplitude of the component of said resultant signal at said predetermined frequency; and control means connected to receive said sixth output signal and responsive thereto to vary said variable attenuator means to eliminate said component of said resultant signal at said predetermined frequency.

9. A non-contacting, self-calibrating vibration sensor comprising:

first means for producing a first output signal representative of the instantaneous displacement between said sensor and an object;

second means for vibrating said first means at a predetermined frequency and amplitude;

third means for producing a second output signal representative of the frequency and amplitude of displacement of said first means;

electrical means for combining said first and second output signals to produce a resultant output signal representative only of the frequency and amplitude of displacement of said object; and, means for adjusting said predetermined frequency of vibration of said sensor including:

a. means for sensing rotational frequency of said object; and, b. means for transmitting a signal representative of said rotational frequency to said second means to preclude said predetermined frequency from occuring at said rotational frequency or a harmonic frequency thereof.

10. A non-contacting, self-calibrating vibration sensor comprising:

first means for producing a first output signal representative of the instantaneous displacement between said sensor and an object;

second means for vibrating said first means at a predetermined frequency and amplitude;

third means for producing a second output signal representative of the frequency and amplitude of displacement of said first means; and, electrical means for combining said first and second output signals to produce a resultant output signal representative only of the frequency and amplitude of displacement of said object, said electrical means further including:

a. phase shift means connected to receive said first output signal and responsive thereto to provide a third output signal in phase with said second output signal;

b. summing means having first and second input terminals and an output terminal, said summing means being connected to receive said second output signal on said first input terminal and to receive said third output signal on said second input terminal, wherein said summing means is effective to combine said second and third output signals in inverse phase relationship to produce said resultant output signal;

c. variable attenuator means serially connected between said first means and said phase shift means;

d. frequency responsive means connected to receive said resultant output signal and effective to provide a fourth signal when said resultant output signal contains a component at said predetermined frequency;

e. control means connected to receive said fourth signal from said frequency responsive means and responsive thereto to vary said variable attenuator means to eliminate said component of said resultant output signal at said predetermined frequency;

f. amplitude and frequency responsive means connected to receive said second output signal and effective to provide a fifth signal proportional to the amplitude of the component of said second output signal at said predetermined frequency;

g. driver means responsive to said fifth signal to provide driving impulses to said second means to maintain said vibrations at said predetermined amplitude.

* * * * *